(12) United States Patent
Breunig et al.

(10) Patent No.: US 9,310,085 B2
(45) Date of Patent: Apr. 12, 2016

(54) METHOD OF CONDUCTING AT LEAST ONE COOKING PROCESS

(71) Applicant: RATIONAL AG, Landsberg/Lech (DE)

(72) Inventors: Manfred Breunig, Schongau (DE); Michael Greiner, Landsberg (DE)

(73) Assignee: RATIONAL AG, Landsberg/Lech (DE)

( * ) Notice: Subject to any disclaimer, the term of this patent is extended or adjusted under 35 U.S.C. 154(b) by 298 days.

(21) Appl. No.: 14/048,642

(22) Filed: Oct. 8, 2013

(65) Prior Publication Data

US 2014/0050826 A1 Feb. 20, 2014

Related U.S. Application Data

(63) Continuation of application No. 13/238,481, filed on Sep. 21, 2011, now abandoned, which is a continuation of application No. 12/115,892, filed on May 6, 2008, now Pat. No. 8,455,028.

(30) Foreign Application Priority Data

May 7, 2007 (EP) .................................... 07009155

(51) Int. Cl.
*A01K 43/00* (2006.01)
*H05B 6/50* (2006.01)
(Continued)

(52) U.S. Cl.
CPC . *F24C 7/081* (2013.01); *A21B 3/07* (2013.01); *A23L 1/0128* (2013.01); *A23L 1/0135* (2013.01); *A47J 27/62* (2013.01); *A47J 39/006* (2013.01); *F24C 3/122* (2013.01); *F24C 7/08* (2013.01)

(58) Field of Classification Search
CPC ...... A21B 3/07; A23L 1/0128; A23L 1/0135; A47J 27/62; A47J 39/006; F24C 3/122; F24C 7/08; F24C 7/081

USPC ......... 219/704, 685, 763, 518, 502, 710, 494, 219/716, 401, 398, 431, 440, 411, 412, 492, 219/506, 702, 719; 426/231
See application file for complete search history.

(56) References Cited

U.S. PATENT DOCUMENTS

| 3,783,769 A | 1/1974 | Goodhouse et al. |
| 3,979,056 A | 9/1976 | Barnes |

(Continued)

FOREIGN PATENT DOCUMENTS

| CA | 2195641 | 2/1996 |
| DE | 43 24 015 | 12/1994 |

(Continued)

OTHER PUBLICATIONS

Applicant Submission in EP07009155.8, dated Oct. 16, 2007 and translation.

(Continued)

*Primary Examiner* — Dana Ross
*Assistant Examiner* — Ket D Dang
(74) *Attorney, Agent, or Firm* — Marshall, Gerstein & Borun LLP

(57) ABSTRACT

A method of operating a cooking appliance that includes performing at least one cooking process on a first item of a plurality of items in a first cooking chamber zone of the cooking chamber. The at least one cooking process being performed based on parameters entered through the input device. The method also includes identifying a second item to be cooked in the cooking chamber of the cooking appliance. The method further includes proposing, with an output device, cooking the second item in the cooking chamber of the cooking appliance, and displaying, with the output device, a loading request indicating a second cooking chamber zone in which the second item is to be loaded. Further, the method includes cooking the second item while the first item is already cooking such that the second item is cooked at least partially overlapping with the first item.

20 Claims, 1 Drawing Sheet

(51) Int. Cl.
*F24C 7/08* (2006.01)
*A21B 3/07* (2006.01)
*A23L 1/01* (2006.01)
*A47J 27/62* (2006.01)
*A47J 39/00* (2006.01)
*F24C 3/12* (2006.01)

(56) References Cited

U.S. PATENT DOCUMENTS

| | | | |
|---|---|---|---|
| 4,920,948 A | 5/1990 | Koether et al. | |
| 5,317,134 A * | 5/1994 | Edamura | H05B 6/6438 |
| | | | 219/506 |
| 5,426,580 A | 6/1995 | Yoshida et al. | |
| 5,520,095 A | 5/1996 | Huber et al. | |
| 6,083,543 A | 7/2000 | Kim et al. | |
| 6,753,027 B1 | 6/2004 | Greiner et al. | |
| 6,773,738 B2 | 8/2004 | Berger et al. | |
| 7,126,088 B2 | 10/2006 | Horton et al. | |
| 7,141,258 B2 | 11/2006 | Hillmann | |
| 7,166,824 B2 * | 1/2007 | Kanzaki | H05B 6/6479 |
| | | | 219/440 |
| 2001/0051202 A1 | 12/2001 | Hofer | |
| 2003/0139843 A1 | 7/2003 | Hu et al. | |
| 2006/0185810 A1 | 8/2006 | Juergens et al. | |
| 2009/0274802 A1 | 11/2009 | Kling et al. | |

FOREIGN PATENT DOCUMENTS

| | | |
|---|---|---|
| DE | 196 09 116 | 9/1997 |
| DE | 1 99 45 021 | 4/2001 |
| DE | 202 03 117 | 2/2002 |
| DE | 101 32 581 | 1/2003 |
| DE | 10 2005 020 744 | 12/2006 |
| DE | 10 2006 008 096 | 8/2007 |
| EP | 0 313 768 | 5/1989 |
| EP | 1 338 849 | 8/2003 |
| EP | 220747 A1 | 12/2010 |
| GB | 2 380 923 | 4/2003 |
| WO | WO-96/03681 | 2/1996 |
| WO | WO-98/52418 | 11/1998 |
| WO | WO-2005/016096 | 2/2005 |

OTHER PUBLICATIONS

Extended European Search Report in connection with EP07009155.8, dated Jan. 24, 2008.
Partial European Search Report in connection with EP07009155.8, dated Sep. 18, 2007.
Office Action for U.S. Appl. No. 13/238,481 dated Feb. 1, 2013.

* cited by examiner

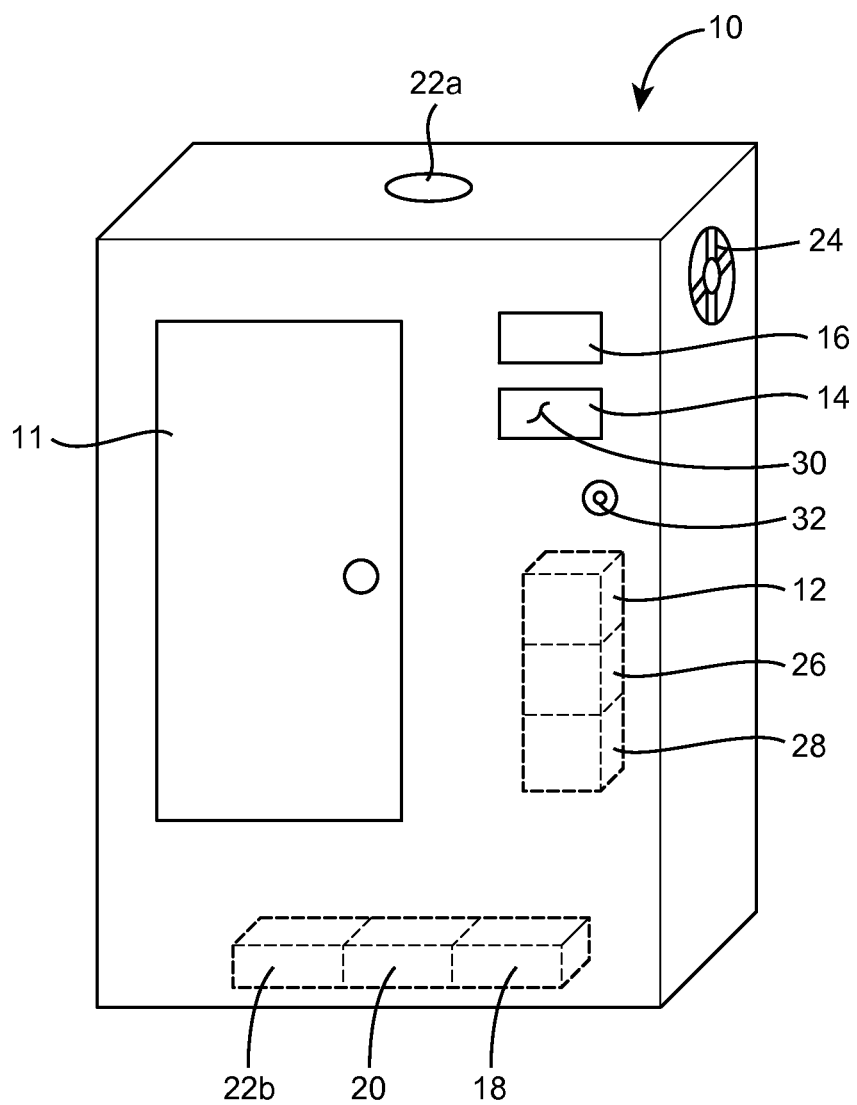

METHOD OF CONDUCTING AT LEAST ONE COOKING PROCESS

CROSS-REFERENCE TO RELATED APPLICATIONS

This is a continuation of U.S. patent application Ser. No. 13/238,481, filed Sep. 21, 2011, which is a divisional of U.S. patent application Ser. No. 12/115,892, filed May 6, 2008, which claims the priority benefit of European Patent Application No. EP 07009155.8, filed May 7, 2007. The entire contents of each of the foregoing are incorporated herein by reference.

FIELD OF THE DISCLOSURE

The present disclosure is directed to a cooking appliance and method for cooking.

BACKGROUND

Numerous methods are known in the state of the art for the conduction of at least one cooking process.

Thus, for example, it is known from DE 199 45 021 A1 that a cooking process can be conducted as a function of a given cooking product size as cooking parameter, whereby the core temperature of a cooking product, the diameter of the cooking product, the density of the cooking product, the type of cooking product, the degree of ripeness of the cooking product, the pH value of the cooking product, the consistency of the cooking product, the storage state of the cooking product, the odor of the cooking product, the flavor of the cooking product, the quality of the cooking product, the browning of the cooking product, the crust formation of the cooking product, the vitamin degradation of the cooking product, the formation of carcinogenic substances in the cooking product, the hygiene of the cooking product, and/or the thermal conductivity of the cooking product can be determined as cooking product parameters.

From EP 1 338 849 A1, the conduction of a cooking process as a function of at least two parameters is known, that can be selected by an operator through a characteristic diagram that is at least two-dimensional. The parameters can be, for example, a degree of browning, that is, the external degree of doneness of a cooking product, or a core temperature, that is, the internal doneness of the cooking product.

DE 196 09 116 A1 discloses a cooking method in a cooking chamber, which is ended when an actual core temperature reaches a target core temperature in a cooking product. If, in addition, the end time point of the cooking method is set, the cooking chamber temperature, the circulating flow velocity in the cooking chamber and the moisture content in the cooking chamber are set or changed in such a way that the target core temperature is reached at the predetermined ending time.

Furthermore, numerous methods are known from the state of the art, which concern the cooking of a multiple number of cooking products in the cooking appliance, especially in different loading levels of a cooking chamber.

Thus, a cooking appliance with a multiple number of loading levels is known from WO 2005/016096 A1 and DE 43 24 015 C1, whereby a clock that can be either initiated manually or is triggered automatically is assigned to each loading level, with which a cooking time can be set in this loading level, which makes it possible to display a remaining cooking time for this loading level on a display unit and/or, after the elapse of the cooking time, to output a message for unloading the cooking product from this loading level.

DE 101 32 581 A1 also concerns a cooking appliance with a multiple number of treatment levels, in which different cooking products can be cooked. Hereby it is possible to obtain a common end time of these cooking products in case the cooking of these was begun simultaneously, even when the cooking products require different cooking times. For this purpose, the cooking chamber atmosphere can be set separately in the different loading levels, in order that the different cooking methods can be conducted parallel in a cooking chamber in an energy saving manner.

In one method according to not prepublished EP 1 798 479 A1, a cooking appliance displays which cooking products can be cooked simultaneously with cooking products already arranged inside the cooking chamber of the cooking appliance.

Furthermore, it is known from EP 0 313 768 B2 that a parameter-controlled system can be used in a cooking appliance, that makes it possible to preset at least one heating parameter through an input device when a certain cooking product is selected, and when the input device is actuated again, to display a position in the cooking chamber for the selected cooking product.

Moreover, DE 10 2005 020 744 B3 discloses the compensation for the opening of a cooking chamber door during the conduction of a cooking process. However, in spite of the numerous cooking methods and cooking appliances known in the state of the art, there is still need for further flexibility in connection with the simultaneous automation of a cooking method.

BRIEF DESCRIPTION OF THE DRAWING

FIG. 1 is a perspective view of a cooking appliance constructed in accordance with the principles of the present disclosure.

GENERAL DESCRIPTION

Therefore, one task of the disclosure is to further develop the generic cooking appliance in such a way that, with increased flexibility, enhanced cooking reliability is achieved in comparison to known cooking appliance by further automation, so that a desired cooking result is achieved at the end of a cooking process.

According to the disclosure, this task can be accomplished by a cooking appliance that proposed if and, if applicable, which cooking product can be cooked in addition to a cooking process already under way.

Thus, a high degree of flexibility is provided while simultaneously retaining the exact conduction of a cooking procedure to attain a desired cooking result. Because, according to the disclosure, the cooking appliance proposes if and, if applicable, which cooking product can be cooked in addition to a cooking process already under way, resulting in a saving of energy and time.

Namely, in a first alternative of using a coking appliance according to the disclosure, the possibility of conducting several cooking programs automatically in succession is provided, even interlaced with one another, without predetermining a sequence and also several times. For example, by selecting a starting time, the entire morning program in a bakery can be preset once, so that the personnel of the bakery is informed accurately each morning as to when and which cooking product is to be loaded and subsequently unloaded. In addition, mixed loads of finishing runs, for example, for preparation of a banquet can be preprogrammed, whereby foods with longer cooking durations receive a loading request first. In a second alternative, the flexibility during cooking is increased by the fact that an operator can enter that a cooking process is to be optimized with regard to energy consumption, required time, and/or weight loss of the cooking product. Thus, specifically, a combination of these two alternatives leads to the fact that an operator can select a multiple number of cooking programs while simultaneously requiring the cooking to be performed in an energy-saving manner. Then, this information is evaluated so that an energy-optimized program linkage is proposed, by displaying when and which cooking product is to be loaded and unloaded.

Hereby, according to the disclosure, preferably, the output device displays a loading request, preferably indicating the cooking product and/or a cooking chamber zone such as a loading level, an error message and/or a cooking information in dependence of the entered parameters, a multiple number of stored data, especially including cooking courses, at least one first measured value determined in the cooking chamber, at least one second measured value determined in at least one cooking product, at least one third measured value of a cooking medium, and/or at least one fourth measured value for an opening of a door for closing a cooking chamber. Also a testing of the plausibility of the inputs of the operator can occur automatically.

Furthermore, it can be provided that at least one value characteristic for the internal degree of doneness and/or external degree of doneness that is desired at the end of a cooking program, and/or for the C value of each cooking product can be entered as parameter. This can lead to an increase of cooking quality.

It is also proposed that, during a cooking procedure, a multiple number of cooking programs run, which can also be different at least in part, and/or at least two cooking programs run overlapped at least part of the time, whereby the cooking process is preferably storable and/or during the cooking process preferably a compensation of the effects of opening of a cooking chamber door can be performed.

As a result of this, not only avoidance of dead times as well as saving of resources is achieved, but also tedious multiple entry of many cooking programs can be avoided, namely by storing all inputs, while the desired cooking results are ensured by compensation for each opening of a cooking chamber door.

Furthermore, according to the disclosure, it may be provided that at least one parameter determining at least one cooking parameter is selected through a multidimensional field, which can preferably be displayed on the display device. Thus the operation is simplified.

Further characteristics and advantages of the disclosure follow from the description of specific practical examples given below.

The disclosure also proposes a cooking appliance 10 (FIG. 1) with a door 11 and a control and regulating device 12 in working connection with an input device 14 and an output device 16 for performing a method according the invention by activating a heating device 18 comprising at least one electrical heater, a gas burner, a heat exchanger, and/or a device for introducing electromagnetic radiation into the cooking chamber, especially in the form of a microwave source; a device for introducing moisture 20 into the cooking chamber comprising at least one steam generator, a water atomizer, and/or a steaming device; a device for removing moisture 22a, 22b from the cooking chamber comprising at least one fresh air inlet 22a and/or a condenser 22b; and a device for circulating the cooking chamber atmosphere 24 comprising at least one fan and/or one pump.

Hereby, embodiments can be characterized by a memory device 26 in which a multiple number of cooking courses are stored, whereby, preferably, after completion of each cooking process each performed cooking courses can be stored in the memory device 26.

Furthermore, according to the disclosure, at least one sensor unit 28 is provided, with which the first, second, third, and/or fourth measured value can be determined.

Finally, it can also be provided according to the disclosure that the input device 14 makes it possible to select at least two parameters over a two-dimensional field, for example, using a touch-screen 30 or a joystick 32.

DESCRIPTION OF PREFERRED EMBODIMENTS

For example, a method according to the disclosure makes it possible to optimize the morning loading of counters for a bakery store with regard to time and energy. Thus, cooking programs used each day, intended to process bakery products to be freshly baked each day from frozen parts of dough or from prebaked products, can be entered once through an input device in a cooking appliance and stored, so that after starting the cooking appliance each morning, it first heats its cooking chamber and then goes through the predetermined programs, so to speak in a stack, and, to be precise, with special consideration of optimization of time and energy. For example, if baguettes, bread rolls, pretzels and croissants are to be baked each morning, then the following requirements may appear on a display device of the cooking appliance after its staring and a heating time:

load baguettes;
unload baguettes;
load bread rolls;
unload bread rolls;
load pretzels;
unload pretzels;
load croissants; and
unload croissants, whereby preheating may occur between each of the various requests for loading. The counters of the bakery store are filled after running through this stack of programs.

Another processing of a program stack may be useful, for example, in the preparation of a lunch menu for catering in schools. In this case, meals, for example, in the form of a slice of meat, a potato side dish, and a vegetable side dish are regenerated or finish cooked in food containers for many students so that the serving of foods can take place at a given time. After turning on the cooking appliance according o the disclosure and input of the foods, an optimum linkage of the cooking methods to be performed is calculated, and then, after heating the cooking chamber, the request is issued to load the meat first. After a first time span, the request to load the potato side dish follows. After a second time span, the request to load the vegetable side dish is given. After a third time span, finally the request comes to unload the meat as well as the potato side dish and the vegetable side dish.

For example, parallel to a steaming of vegetable in a cooking chamber, cooking of eggs can also be performed, since both require a similar cooking chamber atmosphere. More precisely, it can be said that when introducing the potato preparation into a steaming process and cooking eggs in a cooking appliance according to the disclosure, after a preheating step, it will appear on a display device, that the potatoes and the eggs should be loaded simultaneously, and then an unloading display for the eggs will follow before the unloading display for the potatoes appears. Hereby, the times of opening the door are taken into account automatically, as described, for example, in DE 10 2005 020 744 B3 of the Applicant.

The interlacing and/or stacking of programs according to the disclosure also makes it possible to use a cooking chamber atmosphere in an energy and time-saving manner for the purpose of preparing different aliments.

It should also be pointed out that cooking appliance according to the disclosure calculates an optimal time sequence of processes running one after another and/or running partly parallel, and it displays the corresponding result to the operator via loading and unloading requests. In order to introduce additional variability here, according to the disclosure performing the cooking with different priorities is also provided. In other words, not only optimization of the cooking quality should occur, but it should also be possible for a client to choose a variation that is optimized for energy, time or weight. Of course, all these parameters mutually influence one another, so that a compromise is selected, so that, in other words, the selection by an operator establishes a focal point for the optimization of a cooking method. Thus, for example, a display device of a cooking appliance according to the disclosure can display a two-dimensional field for the selection of cooking parameters, for example, with time plotted on the x-axis and energy on the y-axis, and an operator can choose a point in this field. If the display device is in the form a touchscreen, a point can simply be activated by finger pressure, but selection with a joystick is also conceivable.

Optimization of time and energy is achieved with cooking appliances which, in addition to a conventional heating device, either in the form of an electric heating device or including a gas burner, have at least one microwave source, since microwaves make possible greater flexibility, because they lead to a rapid increase of the core temperature inside a cooking product, without this resulting in the arrival at a determined end state at an early point in time. Therefore, when directing a microwave source, it is recommended that the so-called cooking value (C value) be utilized in conducting the cooking process, which can be calculated as follows:

$$C_{BT}^{UF} = \int_{St}^{t'} UF^{\frac{[T(t)-BT]}{10}} dt,$$

where UF=conversion factor;
BT=reference temperature=100° C.;
T(t)=core temperature curve;
St=time at which a starting temperature was exceeded, depending on the food; and
t'=actual time.

For example, let us assume that an operator of a cooking appliance according to the disclosure has to serve food for a festivity at a given time and the preparation should proceed in an energy-saving manner. Thus, in preparation for the festivity, the operator could enter that on the day of the festivity, a roast should be cooked to be ready at a given time, and with as little energy consumption as possible. Then the method according to the disclosure would calculate the time at which the loading display should appear, in order to remind the operator to load the cooking appliance.

Should the time desired by the operator for having the roast ready be shorter that the actually required cooking time, then a corresponding message will appear on the display device of the cooking appliance, namely, in the form of an error message. Therefore a plausibility testing occurs automatically according to the disclosure.

During a cooking process, the actual cooking appliance settings, for example, regarding the microwave power, moisture and similar, can be displayed on the display device. According to the disclosure it is also possible for an operator to receive information via the display device as to which cooking product could be cooked optimally parallel to a cooking process that is already running. Thus, for example, when cooking a roast, which takes a long time, vegetable side dishes can be added at a given time. Thus, an optimum interlacing of programs and parallel processing of cooking products is proposed.

Furthermore, it is pointed out that the calculations in the method according to the disclosure can be carried out based on previously recorded measured curves assuming full loading of a cooking appliance, so that, in case of partial loading, an adjustment of the process must take place automatically, namely as a function of measured values obtained with at least one measuring device. Such adjustments are known in the state of the art, see for example DE 196 09 116 A1.

The advantage of linking or stacking of programs also consist, specifically, in the fact that an operator needs to enter a sequence of cooking programs only once and can leave it in the cooking appliance.

The characteristics disclosed in the above description and in the claims can be essential both individually and also in any arbitrary combination for the realization of the disclosure in its various embodiments.

What is claimed is:

1. A method of operating a cooking appliance that includes a cooking chamber with a plurality of cooking chamber zones, an input device, and an output device, the method comprising:
    cooking, with at least one cooking program, a first item of a plurality of items to be cooked in at least a first cooking chamber zone of the plurality of cooking chamber zones of the cooking chamber by performing at least one cooking process based on parameters entered through the input device,
    identifying a second item of the plurality of items to be cooked in the cooking chamber of the cooking appliance,
    proposing, with the output device, cooking the second item in the cooking chamber of the cooking appliance,
    indicating, with the output device, when the second item is to be loaded into the cooking chamber,
    cooking, with the at least one cooking program, the second item in a second cooking chamber zone of the cooking chamber at least partially overlapping with the cooking of the first item such that the second item is cooked while the first item is already undergoing the at least one cooking process, and
    indicating, with the output device, when the first and second items are to be removed from the cooking chamber based on the parameters entered through the input device,
    wherein
    the parameters entered through the input device serve to select said plurality of items to be cooked and at least one of a start and end time for cooking at least one of the items to be cooked and at least one cooking parameter, and
    the at least one cooking program in the cooking chamber is controlled on the basis of the parameters entered through the input device.

2. The method according to claim 1, wherein cooking the first item and the cooking the second item each comprises using at least one of a heater, a gas burner, a heat exchanger, a microwave source, a device for radiating electromagnetic radiation into the cooking chamber, a steam generator, a water atomizer, and a steaming device.

3. The method according to claim 1, further comprising receiving input via the input device, the input comprising at least two parameters selected on a two-dimensional field of the input device.

4. The method according to claim 3, wherein receiving the input comprises receiving parameters via a touch-screen or joystick of the input device.

5. The method according to claim 1, further comprising displaying, with the output device, a loading request indicating at least the second cooking chamber zone of the plurality of cooking chamber zones in which the second item is to be loaded.

6. The method according to claim 1, further comprising optimizing, based on the parameters entered through the input device, the at least one cooking process with regard to at least one of: energy consumed by the cooking appliance, required time, and weight loss of each item to be cooked.

7. The method according to claim 1, further comprising displaying, with the output device, at least one of an error message, cooking information based on the parameters entered through the input device, multiple stored data, at least one first measured value obtained in the cooking chamber, at least one second measured value obtained in at least one cooking product, at least one third measured value of a cooking medium, and at least one fourth measured value for an opening of a door for closing the cooking chamber, wherein the first, the second, the third, and the fourth measured values are detected via at least one sensing unit.

8. The method according to claim 1, further comprising storing the at least one cooking process in a memory device of the cooking appliance.

9. The method according to claim 8, wherein storing the at least one cooking process in the memory device of the cooking appliance occurs after the end of the at least one cooking process.

10. A method of operating a cooking appliance that includes a cooking chamber with a plurality of cooking chamber zones, a heating device having at least one of a heater, a gas burner, a heat exchanger, and a device for radiating electromagnetic radiation into the cooking chamber, a device for introducing moisture into the cooking chamber, the device for introducing moisture comprising at least one of a steam generator, a water atomizer, and a steaming device, a device for removing moisture from the cooking chamber, the device for removing moisture comprising at least one of a fresh air inlet and a condenser, a device for circulating an atmosphere in the cooking chamber, the device for circulating an atmosphere comprising at least one of a fan and a pump, an input device adapted to receive parameters identifying (a) a plurality of items to be cooked during at least one cooking process, (b) at least one cooking parameter, and (c) at least one of a starting time and an ending time for cooking at least one item of the plurality of items to be cooked, an output device, and a control or regulating means, the method comprising:

cooking, with at least one cooking program, a first item of the plurality of items to be cooked in at least a first cooking chamber zone of the plurality of cooking chamber zones of the cooking chamber by performing the at least one cooking process based on the parameters received by the input device, identifying, during the cooking of the first item, a second item of the plurality of items to be cooked in the cooking chamber of the cooking appliance, proposing, with the output device, cooking the second item in the cooking chamber of the cooking appliance, indicating, with the output device, when the second item is to be loaded into the cooking chamber, cooking, with the at least one cooking program, the second item in a second cooking chamber zone of the cooking chamber at least partially overlapping with the cooking of the first item such that the second item is cooked while the first item is already undergoing the at least one cooking process, and indicating, with the output device, when the first and second items are to be removed from the cooking chamber based on the parameters received by the input device, wherein the cooking program in the cooking chamber are controlled on the basis of the parameters received by the input device.

11. The method according to claim 10, wherein cooking the first item and cooking the second item each comprises using the at least one of a heater, the gas burner, the heat exchanger, a microwave source, the device for radiating electromagnetic radiation into the cooking chamber, the steam generator, the water atomizer, and the steaming device.

12. The method according to claim 10, further comprising receiving the parameters via the input device, the parameters selected on a two-dimensional field of the input device.

13. The method according to claim 12, wherein receiving the parameters comprises receiving the parameters via a touch-screen or joystick of the input device.

14. The method according to claim 10, further comprising indicating, with the output device, when the first item is to be loaded into the cooking chamber based on the parameters received by the input device.

15. The method according to claim 10, further comprising optimizing, based on the parameters received by the input device, the at least one cooking process with regard to at least one of: energy consumed by the cooking appliance, required time, and weight loss of each item to be cooked.

16. The method according to claim 10, further comprising displaying, with the output device, a loading request indicating at least one item of the plurality of items to be cooked, at least one of the plurality of cooking chamber zones in which the at least one item is to be loaded, an error message, and cooking information based on the parameters received by the input device, multiple stored data, at least one first measured value obtained in the cooking chamber, at least one second measured value obtained in at least one cooking product, at least one third measured value of a cooking medium, and at least one fourth measured value for an opening of a door for closing the cooking chamber, wherein the first, the second, the third, and the fourth measured values are detected via at least one sensing unit.

17. The method according to claim 10, further comprising storing the at least one cooking process in a memory device of the cooking appliance.

18. The method according to claim 17, wherein storing the at least one cooking process in the memory device of the cooking appliance occurs after the end of the at least one cooking process.

19. A method of operating a cooking appliance that includes a cooking chamber with a plurality of cooking chamber zones, a heating device having at least one of a heater, a gas burner, a heat exchanger, and a device for radiating electromagnetic radiation into the cooking chamber, a device for introducing moisture into the cooking chamber, the device for introducing moisture comprising at least one of a steam generator, a water atomizer, and a steaming device, a device for removing moisture from the cooking chamber, the device for removing moisture comprising at least one of a fresh air inlet and a condenser, a device for circulating an atmosphere in the cooking chamber, the device for circulating an atmosphere comprising at least one of a fan and a pump, an input device adapted to receive a plurality of parameters identifying (a) a plurality of items to be cooked during at least one cooking process, (b) at least one cooking parameter, and (c) at least one of a starting time and an ending time for cooking at least one item of the plurality of items to be cooked, an output device, and a control or regulating means, the method comprising:

selecting, based on a first parameter of the plurality of parameters, a first item of the plurality of items to be cooked;

selecting, based on a second parameter of the plurality of parameters, the at least one cooking process for the first item of the plurality of items to be cooked;

cooking, with at least one cooking program, the first item in at least a first cooking chamber zone of the plurality of cooking chamber zones of the cooking chamber by performing the at least one cooking process based on a third parameter of the plurality of parameters;

identifying, during the cooking of the first item, a second item of the plurality of items to be cooked in the cooking chamber;

proposing, to a user of the cooking appliance, with the output device, cooking the second item in the cooking chamber of the cooking appliance;

indicating, with the output device, when the second item is to be loaded into the cooking chamber;

cooking, with the at least one cooking program, the second item in a second cooking chamber zone of the cooking chamber, the cooking of the first item at least partially overlapping with the cooking of the first item such that the second item is cooked while the first item is already undergoing the at least one cooking process; and indicating, with the output device, when the first and second items are to be removed from the cooking chamber based on the plurality of parameters received by the input device, wherein the cooking program in the cooking chamber are controlled on the basis of the parameters received by the input device.

20. The method according to claim 19, wherein the third parameter comprises the starting time and the ending time for the at least one cooking process.

\* \* \* \* \*